(12) United States Patent
Carver et al.

(10) Patent No.: US 10,951,136 B1
(45) Date of Patent: Mar. 16, 2021

(54) CIRCUIT FOR PRODUCING ELECTRICAL ENERGY

(71) Applicant: Calagen, Inc., Portland, OR (US)

(72) Inventors: David Reginald Carver, Baton Rouge, LA (US); Sean William Reynolds, Baton Rouge, LA (US); Sean Claudius Hall, Baton Rouge, LA (US)

(73) Assignee: Calagen, Inc., Portland, OR (US)

( * ) Notice: Subject to any disclaimer, the term of this patent is extended or adjusted under 35 U.S.C. 154(b) by 0 days.

(21) Appl. No.: 16/997,557

(22) Filed: Aug. 19, 2020

Related U.S. Application Data

(60) Provisional application No. 62/889,506, filed on Aug. 20, 2019.

(51) Int. Cl.
| | | |
|---|---|---|
| *H02N 3/00* | (2006.01) | |
| *H01L 35/30* | (2006.01) | |
| *F25B 21/02* | (2006.01) | |
| *H01L 35/00* | (2006.01) | |

(52) U.S. Cl.
CPC .................................... *H02N 3/00* (2013.01)

(58) Field of Classification Search
CPC ........... H02N 3/00; H01L 35/00; H01L 35/28; H01L 35/30; H02M 3/00; H02M 11/00; H02M 2003/1555; H02J 50/10; F25B 21/00; F25B 21/02; H03B 5/08
See application file for complete search history.

(56) References Cited

U.S. PATENT DOCUMENTS

| | | | | |
|---|---|---|---|---|
| 3,343,009 A | * | 9/1967 | Wagini ................. | H02N 11/002 310/306 |
| 6,595,004 B1 | * | 7/2003 | Ghoshal ................. | H01L 35/00 62/3.1 |
| 7,816,601 B2 | * | 10/2010 | Carver .................... | H01L 37/00 136/201 |
| 8,538,529 B2 | * | 9/2013 | James .................... | H02N 1/006 607/35 |
| 2011/0242855 A1 | * | 10/2011 | Jovcic ..................... | H02M 3/07 363/17 |
| 2015/0267944 A1 | * | 9/2015 | Duwel .................... | H01F 1/015 62/3.1 |
| 2016/0128141 A1 | * | 5/2016 | Makosinski .......... | F21V 21/084 315/294 |
| 2019/0103538 A1 | * | 4/2019 | Carver ..................... | H02P 7/00 |

* cited by examiner

*Primary Examiner* — Edgardo San Martin
(74) *Attorney, Agent, or Firm* — Klarquist Sparkman, LLP

(57) ABSTRACT

A circuit for generating electrical energy is disclosed. The circuit uses a pulse generator in combination with a tube having a cavity therein. The tube can have material therein, such as solid material or fluid passing therethrough. A thyristor or other negative resistance is in series with the tube to increase a change of voltage with respect to time. A resultant energy applied to a load is larger than the energy supplied by the pulse generator due to the absorption of external energy by the tube.

20 Claims, 6 Drawing Sheets

CIRCUIT FOR PRODUCING ELECTRICAL ENERGY

CROSS REFERENCE TO RELATED APPLICATION

This application claims priority from U.S. Provisional Application No. 62/889,506, filed Aug. 20, 2019, which application is incorporated herein by reference in its entirety.

BACKGROUND

Generation of electrical energy is a fundamental technique for our society's energy needs. Conversion of the thermal energy contained in a plasma flame, such as a cylinder in an internal combustion engine, is an example of the utilization of thermal energy to provide for its conversion into mechanical energy. A convenient and direct method for the conversion of thermal energy to electrical energy is a much needed and desirable method for generating electrical power.

DETAILED DESCRIPTION

A method and system are disclosed for the generation of electrical energy for use in numerous applications. The method is general in its applications and can be applied to many electrically powered devices, such as portable tools, sensors, optical devices, lighting, heating, cooling, breathing apparatus, medical devices, timing devices, portable computers, cell phones, powered cooling or heating devices as well as other similar and larger stationary applications where a convenient and powerful supply of electrical energy is needed. The need for such a device and method is well documented.

The Carver Voltaic Effect (CVE) is a kinetic physical effect that can be used to provide significant electrical power. The CVE can be described as the minute transient increase in the power of a single power transmission transient in electrical conductors or in energy transfers in materials through space. The term "kinetic" is used to describe the transitory nature of the effect. It can be detected during transitory events, such as fast voltage changes and some other phase and state changes in materials. Embodiments of the devices described herein are constructed to take advantage of this phenomena (i.e., the CVE) by the apparent conversion of thermal energy to electrical energy. The magnitude of the CVE is associated with large dV/dt values (changes in voltage with respect to time).

Understanding the operation and manufacture of the device includes the recognition of the presence of an etalon in the output circuit and methods for the implementation and manufacture of the etalon are disclosed.

Figure 1:
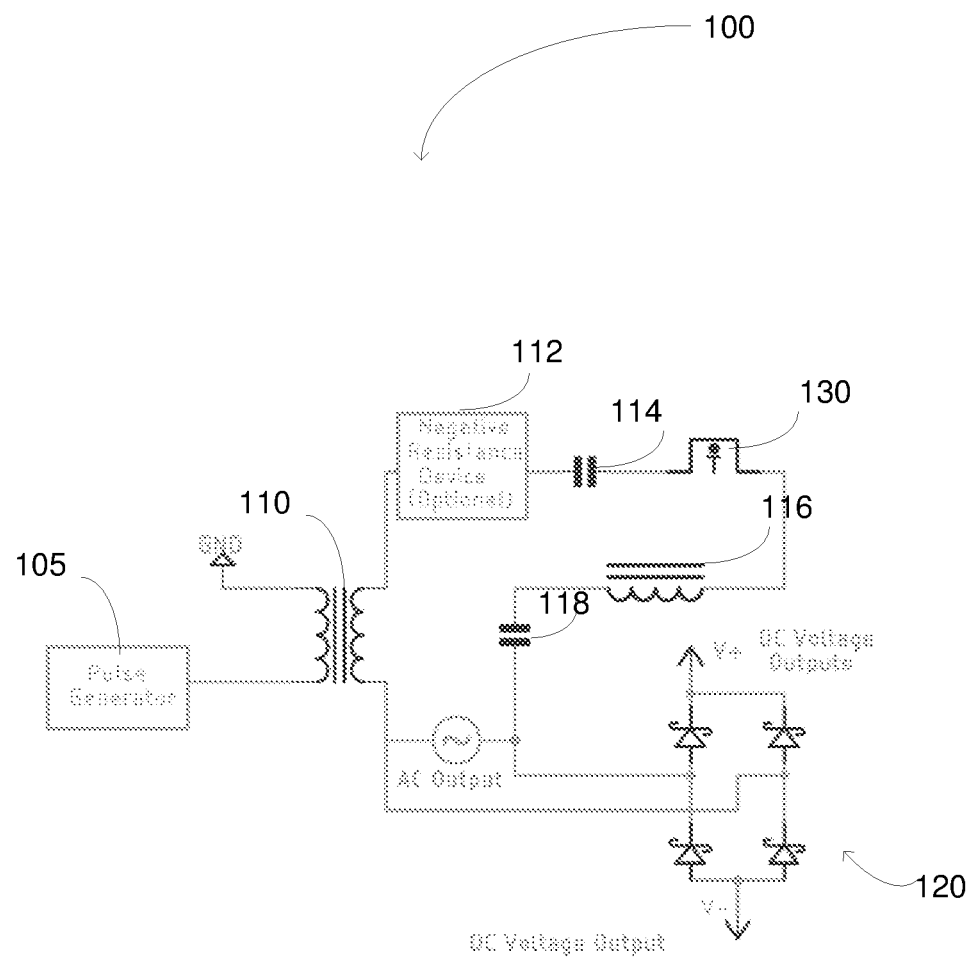
FIG. 1 is an example circuit used for generating electrical energy.

In FIG. 1, is a circuit 100 for converting thermal energy into electrical energy. A square wave generator 105 generates a square wave pulse train (continuous pulses) that enters a primary side of a coupled inductor 110. The coupled inductor's secondary side is connected to a nonlinear resistive device, or as is sometimes called, a negative resistance device 112, such as a thyristor. The negative resistance device 112 serves as a device to limit the current from the secondary to a certain value determined by its internal construction based upon the input voltage. It will not conduct meaningful current until the voltage exceeds a certain amount in the positive direction and will not conduct in the negative voltage until the voltage is more negative than a certain amount. For example, the two voltages may be +25V and −25V. Because of this voltage characteristic, the output of the secondary side of the coupled inductor is always certain to exceed +25V and −25 Volts provided sufficient power is available to overcome parasitic losses.

The negative resistance device can be any device that can provide this type of action. Example devices include, but are not limited to, the following:
1. Gas discharge lamps
2. Spark gaps
3. Zener diodes
4. Thyristors
5. Triacs
6. Gunn diodes
7. Diodes (all kinds)
8. Silicon controlled rectifiers (SCR)
9. Switching devices controlled by a logic circuit As the driving electronics for the transformer (or coupled inductor) cause the output of the secondary to swing from positive to negative, very fast transitions from the >25V to more negative than −25V will take place. These high dV/dt transients are then utilized to produce fast voltage swings desired for the CVE to be utilized. Thus, the larger the dV/dt (higher voltage, less time), the more pronounced the CVE. The square wave in combination with the negative resistance device 112 help to achieve this goal. In this example, the capacitor C1 114 and the inductor 116 form an oscillatory circuit that further amplifies the effects of the current with its voltage swings to produce useful output at C2 118. The C2 capacitor 118 is in turn connected to one or more rectification diodes, shown generally at 120 to produce both a positive and negative voltage output, V+ and V−, respectively. The oscillatory circuit formed by the capacitor 114 and inductor 116 can generate a signal oscillating at a frequency greater than the frequency of the square wave input signal.

A thermal exchanger 130 provides a thermal conduction path for the materials to have a continual influx of thermal energy for conversion to electrical energy. The thermal exchanger can be any device used to inject heat into the circuit. In one example, a tube (e.g., a conductive tube or non-conductive tube) is used that is filled with material having a desired permittivity and permeability. Potential materials include air, water, methanol, ethanol, and acetamide (or a solution in liquids such as water or ethanol). Ferrite slurries can also be used. The material can be pumped or circulated through the tube using an external pump, not shown. Alternatively, the solid materials can be immobilized within the resonant cavity. Subsequently liquids can be pumped through the tube to provide heat exchange to the materials and the tube itself. The tube can be any desired length. For example, the tube can be 1 ft to 5 ft in length. The tube can be any desired shape in cross-section such as round, square, rectangular, elliptical, a flat-sided oval, or a custom shape. Any geometric shape can be used (e.g., an N-sided polygon or a folded shape). Whatever the cross-section, the tube can be elongated with a cavity therein through which fluid can pass. The tube can be an etalon as described herein.

Figure 2:
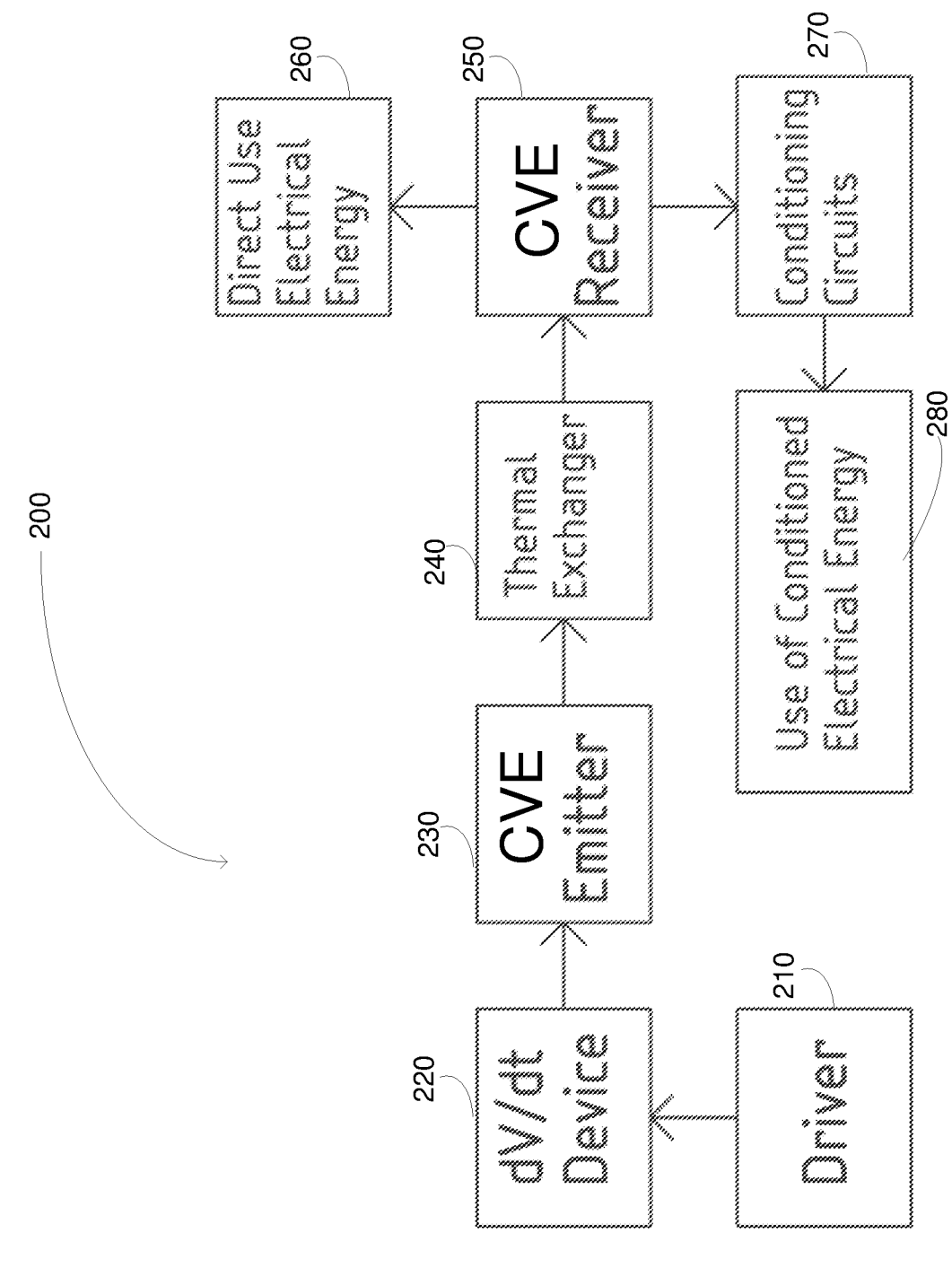
FIG. 2 illustrates a generic embodiment for a circuit for generating electrical energy.

FIG. 2 shows a generic version of the circuit 200. An optional driver 210 can be a continuous pulse generator that supplies a continuous stream of pulses with high dV/dt. This provides the starting impulse to the device. It can serve as the on/off switch to run the device and it can help control the frequency at which the device is operated.

A dV/dt device 220 is shown. FIG. 1 showed the dV/dt device as a transformer or a coupled inductor 110 to indicate at least one way of generating a high dV/dt pulse or series of pulses. Alternatives to this could be a capacitor or capacitor array, a mechanical switch, or other spinning or rotation devices that bring an electrical (charge) or magnetic field (magnet) in proximity to another coil, capacitor, inductor, or another magnet or magnetic field. The CVE device may have one or more significant active devices incorporated within it. Examples are the negative resistance devices, such as a thyristor or Zener diode.

The CVE emitter 230 is shown coupled to a thermal exchanger 240. The thermal exchanger can, in turn, be coupled to a CVE receiver 250. The rapid formation of a dV/dt charge on the emitter 230 leads to the production of a "wave" of energy from the emitter. In this antenna-like mode, the emitter may be in contact with a material other than a vacuum or air. The material may have the properties of having a different dielectric constant or magnetic permeability characterized by its relative permittivity or permeability. It may also be in contact with a conductive material. The emitter 230 and receiver 250 can be a wide variety of materials (e.g., copper, brass, bronze, stainless steel, graphene) that create impedance changes at the ends of the etalon chamber. Indeed, anything can be used, so long as it changes the permittivity, permeability, or both with respect to the material between the emitter and receiver. Thus, the emitter 230 couples the circuit to the thermal exchanger 240 (which can be an etalon) and transmits a signal to the thermal exchanger. The receiver 250 receives the signal once it passes through the thermal exchanger.

The thermal exchanger 240 is shown as being between the CVE emitter and the CVE receiver. It may, in fact, be surrounding the emitter and the receiver. For example, where the thermal exchanger is a tube having a cavity therein, the emitter 230 and receiver 250 can be mounted in respective ends of the tube. The thermal exchanger provides the needed thermal conduction path for the materials to have a continual influx of thermal energy for conversion to electrical energy. The materials may also be electrically conductive. The thermal exchanger can be any device used to inject heat into the circuit. In one example, a tube (e.g., a conductive tube or non-conductive tube) is used that is filled with material having a desired permittivity and permeability. Potential materials include air, water, methanol, ethanol, and acetamide (or a solution in liquids such as water or ethanol). Ferrite slurries can also be used. The material can be pumped or circulated through the thermal exchanger using an external pump, not shown. Alternatively, the solid materials can be immobilized within the resonant cavity. Subsequently liquids can be pumped through the cavity to provide heat exchange to the materials and the cavity itself. Thus, the material can have a dual purpose of acting as a medium between the CVE emitter and CVE receiver and acting as a thermal exchanger having an external source that is circulated through the thermal exchanger. Electronic waves can be transmitted between the CVE emitter and CVE receiver and the permittivity and permeability of the materials contained therein can impact the resonant frequency.

The CVE receiver 250 is shown coupled to the thermal exchanger. It may or may not be in contact (e.g., air gapped or spaced) with the thermal exchanger 240. The receiver 250, by electrical induction from the wave, electrical contact with the thermal exchanger, or by electrical contact with the emitter 230 has the increased energy provided by the CVE. The receiver harvests the converted heat into an electrical conduction path to either be utilized directly by a load 260 or to be conditioned by a conditioning circuit 270. The load 260 can be any desired load and can have a resistive component (e.g., a light bulb). The conditioning circuit 270 are shown connected to the CVE receiver 250. This circuit 270 is typically a circuit to convert the AC signal (or pulsed DC) into another frequency range or convert to a DC voltage or voltages. An example conditioning circuit can be a full bridge rectifier and capacitor.

An electrical load 280 receives an output of the conditioning circuits 270. The load may be anything that uses electrical energy. It is similar to the direct use of the electrical energy load 260 but it may require conditioning from module 270.

Module 260 is the direct use of the output of the CVE receiver 250. This output has typical AC signal characteristics. Resistive loads would be acceptable for this type of electrical characteristic as either square or sinusoidal waves.

Figure 3:
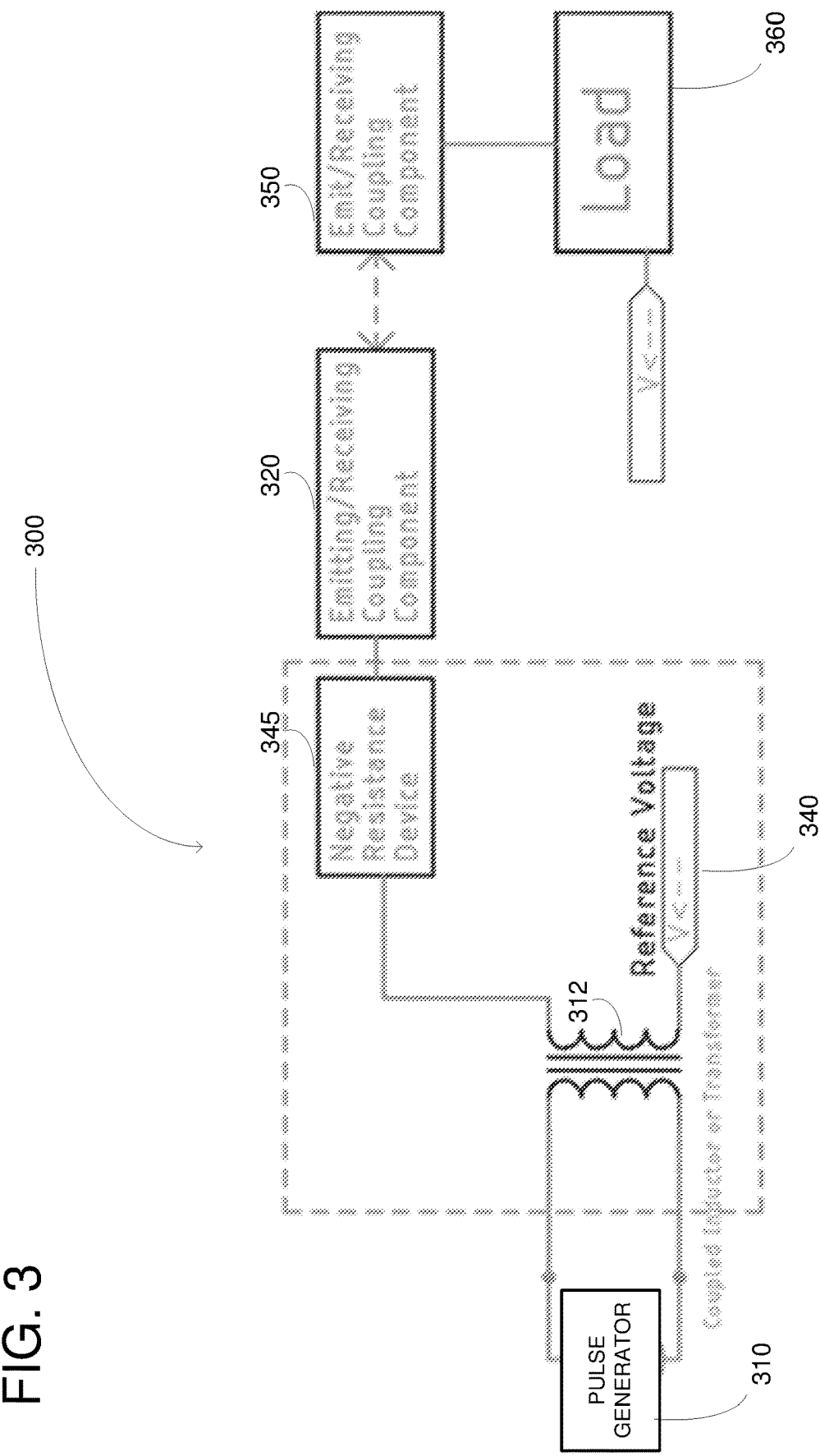
FIG. 3 shows another embodiment of a circuit for generating electrical energy.

FIG. 3 is a circuit 300 in which the negative resistance device is used in conjunction with the emission of the dV/dt wave as shown by connection to component 320. A pulse generator 310 is coupled to an inductor or transformer 312. The output of the secondary of the coupled inductor or transformer 312 is referenced to a voltage indicated by V 340. A negative resistance device 345 is coupled to the inductor The emission of the wave from component 320 can be coupled to the receiving component 350. The receiving component 350 can also be connected to a load 360. The connection between the receiving component 320 and the receiving component 350 is shown by a dashed bidirectional arrow and can be a vacuum, air, or other dielectric materials either homogeneous or heterogenous. Conductive materials can also be used.

Figure 4:
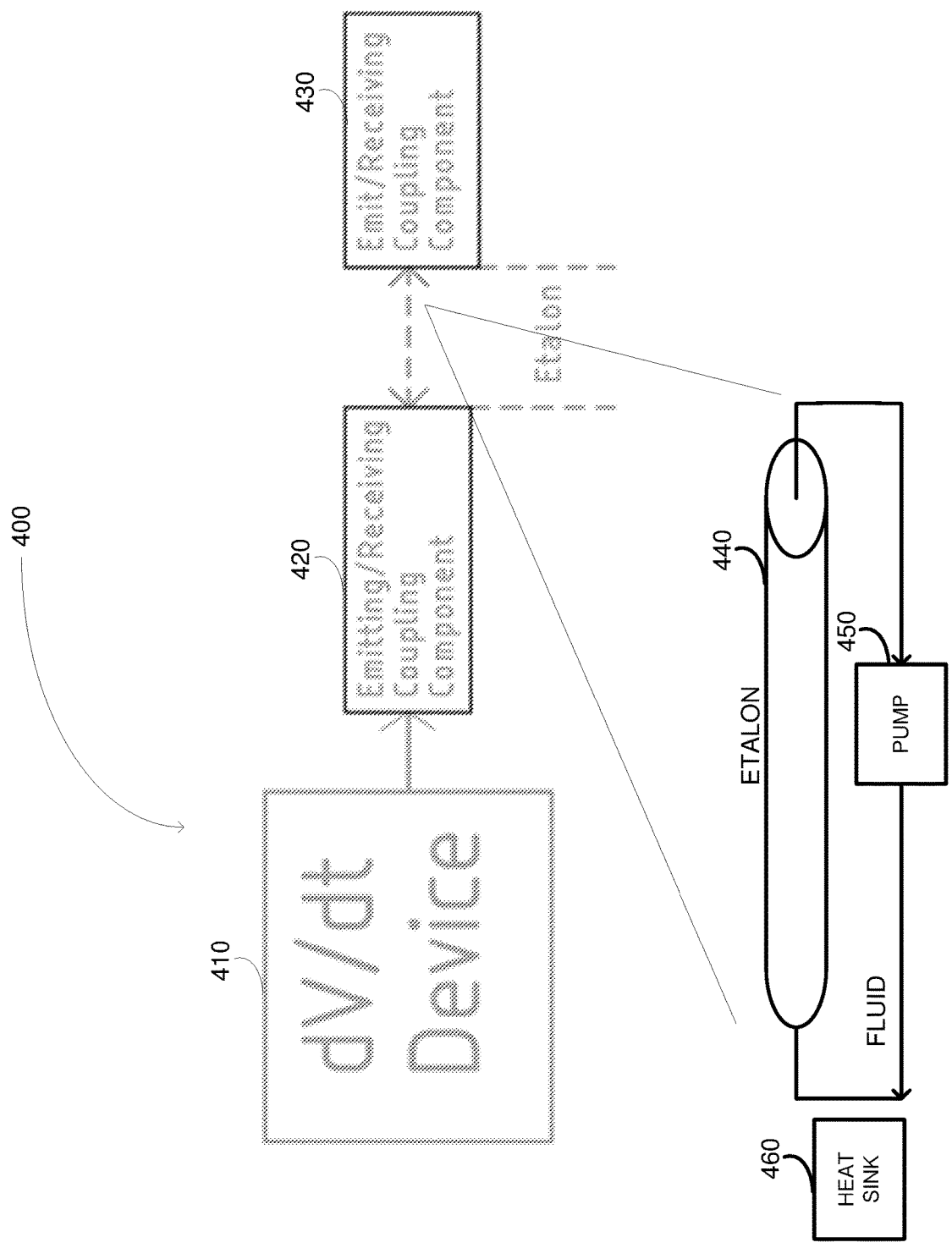
FIG. 4 shows an example etalon having fluid being pumped through a cavity therein.

FIG. 4 is a circuit 400 using an etalon for amplification. The dV/dT device 410 can be any pulse generator. Alternatively, as shown above, the dV/dT device can be a transformer coupled to a negative resistance device, as is shown in FIG. 3.

The combination of elements 420, 430 comprise a resonance cavity similar to an etalon or Fabry-Perot interferometer. It can be similar to the description of the thermal exchanger 130. It is shown without a load. It may be utilized without an attached load by either emission of electrically induced waves or by simply being a higher voltage source reference for reference applications. With a load (e.g. resistive) the etalon can produce amplified power from the dV/dt device by capturing the thermal energy between the emitter and the receiver and the coupling component itself, particularly but not exclusively, when resonance occurs.

Activation frequencies can be used that are much lower than optical frequencies. In most cases, the lowest fundamental wavelength in the resonance cavity is very long compared to the relative sizes of the other components. In order to reduce the size of the resonance cavity, higher relative permittivity or permeability materials can be used to significantly reduce the length of the etalon involved. This area of the device is shown by the dotted double-headed arrow between components 420 and 430.

In the case of a high permittivity capacitors, relative permittivity in the ranges of 3 to ≥20,000 are not uncommon. Higher permittivity materials are known. These materials provide for a highly decreased etalon length by similar factors such as the square root of the inverse of the relative permittivity multiplied by the relative permeability.

An etalon 440 is shown between the components 420, 430. The etalon (wave resonant cavity) chamber can be considered as one (or more) of the oscillator components. This particular etalon differs from a purely electrical conductivity element by involving emitted electrical waves rather than electrical current oscillation in a conductor. A hollow etalon also provides the ability to fill the resonance cavity with a material that has a permittivity (and/or a magnetic permeability) that is greater than vacuum or air. This increased permittivity/permeability decreases the fundamental oscillation length. Folding (or coiling) the length helps reduce the overall size. The etalon cavity may be where most of the heat conversion to electrical energy will take place. Fluid can be moved through the etalon's cavity. The fluid will be constantly cooled by the resonance of the dV/dt waves while the movement of the etalon fluid provides a way to effectively get heat into the resonance volume by carrying the heat from an external source. Or, simple heat conduction/convection into the resonance cavity volume can be used to provide the heat from an external heat source, possibly using a second fluid (e.g. water) or heat pipe.

The etalon 440 is shown as a cylindrical tube, in this embodiment, with a cavity extending therethrough. A pump 450 is used to pump fluid through the etalon 440. A heat sink 460 is used to extract heat from the ambient environment and pass the heat to the fluid. The etalon can then convert the heat to electrical energy. The etalon can be filled with materials that have different permittivities and permeabilities, such as air, water, methanol, ethanol, and acetamide (e.g. in a solution of water or ethanol). Higher permittivity materials allow a lower drive frequency to be used and still be at resonance. The etalon can have a dual purpose of acting as an electrical coupling between the component 420 and the component 430 and also acting as a thermal exchanger.

The emitter 420 and receiver 430 can be a wide variety of materials (e.g., copper, brass, bronze, stainless steel, graphene) that create impedance changes at the ends of the etalon chamber. Different electrical elements can also be used as the emitter 420 and receiver 430, such as inductors and capacitors. Indeed, anything can be used, as long as it changes the permittivity, permeability, or both with respect to the material between the emitter and receiver. The load should be selected so as to have proper impedance matching with the source, as is well known in the laser, transmission, and antenna fields.

Figure 5:
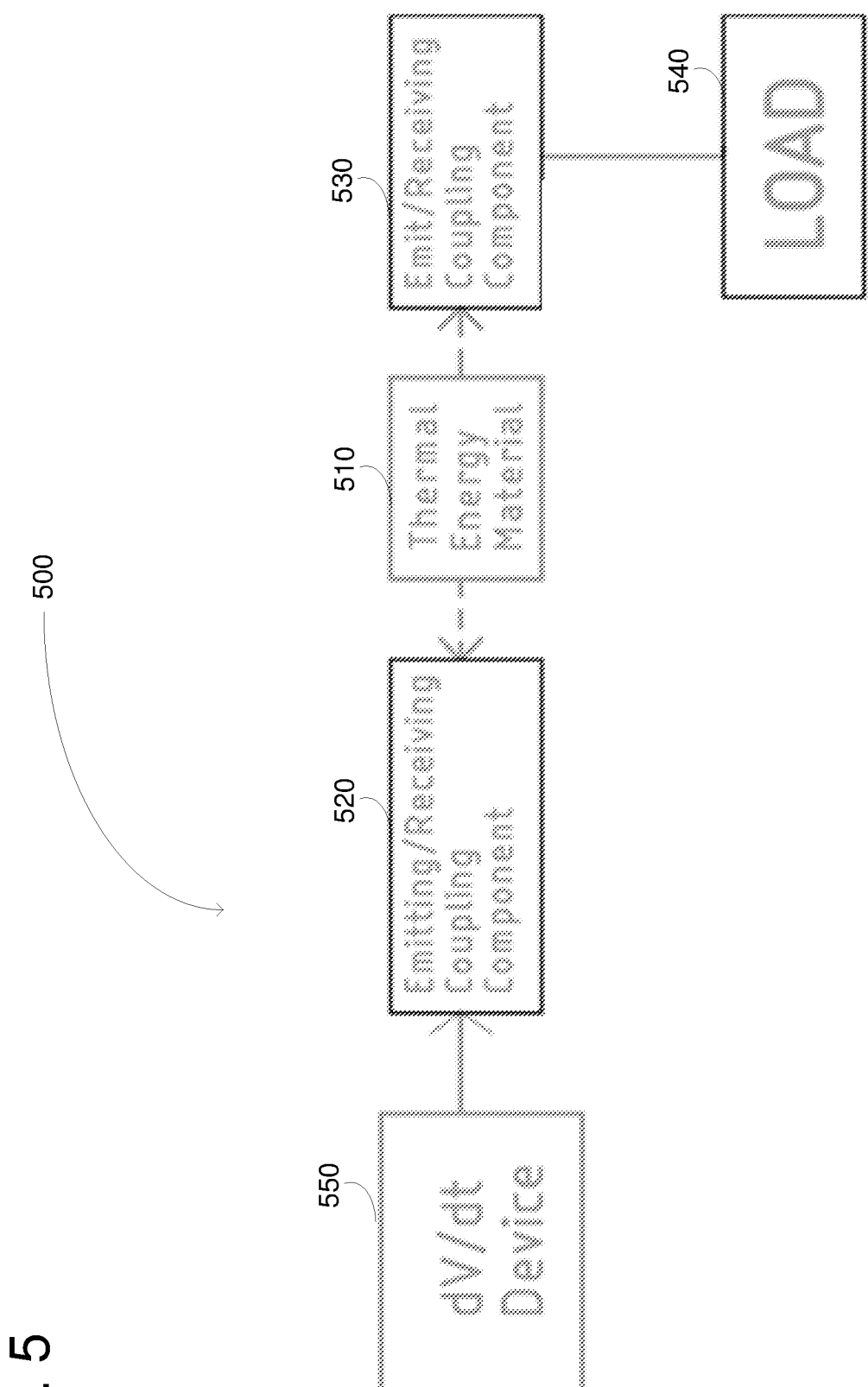
FIG. 5 is a circuit according to another embodiment for generating electrical energy.

FIG. 5 is a circuit 500 that is an additional schematic representation of the material 510 in between the etalon's reflective surfaces, 520 and 530. The thermal energy material 510 is in the transmissive path and/or reflective path of the wave coming from the emitter or the reflected wave from the receiver. Due to the CVE, the power in the wave is augmented by each traverse of the wave between the surfaces. In this way the material 510 is cooled, since the energy required for the increase in energy in the wave is obtained from the thermal energy contained in the material itself due to the law of conservation of energy.

To achieve resonance in a given cavity, the cavity's shape must be taken into account. Square or round shapes may be used as well as oval, elliptical, polygonal, and other geometrical shapes. Also, the material filling a resonance cavity plays a part in determining the frequency of resonance. It is known that increasing the permittivity or permeability of the material filling a given cavity changes its resonance to a lower frequency. In the case of the frequency of electrical waves, the resonant frequency of the cavity is related to the square root of the inverse of the relative permittivity multiplied by the relative permeability of the material vs a pure vacuum. Thus, higher permeability and higher permittivity materials can lead to reduced physical sizes of the etalon cavity.

Higher permittivity materials (Thermal Energy Material) may be used to provide an etalon cavity that is substantially shorter (thereby smaller) than that with vacuum or air-filled cavity. Additionally, the material 510 may be thermally conductive to facilitate thermal transfer into the cavity from the environment or heat source. Liquid materials are attractive in that they can be circulated to facilitate heat transfer. Materials that can be used are those that are transmissive to the wave itself. Some materials (or mixtures, suspensions, or slurries thereof) that may be used but are not the limitation for use are as follows:

1. Barium titanate
2. Other Perovskite mixed metal titanates
3. Ferrite
4. Inorganic Oxides
5. Air
6. Organic alcohols
7. Organic materials that may be transmissive to the wave
8. Conductive metals
9. Semiconductive materials
10. Species of carbon (e.g. graphite, graphene, Fullerenes)
11. Materials which themselves re-resonate at other frequencies (e.g. phosphors, rhodamine) via harmonic generation
12. Water or water with dissolved salts, liquids, or other species suspended or homogeneous.

Materials can be used to partially fill or fully fill the cavity to provide a pathway for thermal conduction to the etalon cavity. The load 540 can be any desired electrical load, such as a load having a resistive component. The dV/dt device 550 is similar to those described above.

As an example of the device, the following set of components can be used.

1. Transformer (coupled inductor), 10:1 ratio, 2 A current rating, 700 uH secondary inductance
2. 0.01 uF, 1000 V ceramic capacitor
3. 254 uH ferrite single inductor, 10 A inductor
4. Copper tube (⅝" OD×½" ID×24 inches length)
5. Powdered ferrite (125 mesh)
6. Resistive load (110 Ohm, 100 W metal film resistor)
7. 2 pc Copper wire (10 AWG×1" long)
8. Zener Diode (1N5388)

Using the schematic shown in FIG. 1, the copper tube is first packed with the ferrite powder. One piece each of the copper wire is inserted into each end of the tube and used to make connection to the remainder of the circuit. The transformer is driven by means of a pulsed current source at a frequency of 1 Hz to several GigaHertz. The exact frequency required can be tuned by maximizing the ratio of power produced to the power necessary to drive the transformer's primary. The secondary of the transformer is attached to one piece of the copper wire in the copper tube. The other end of the copper tube with the remaining wire is attached to a negative resistance device such as a Zener diode. The other end of the diode is attached to an inductor. The remaining connection is led back to the secondary of the transformer's output. Electrical energy can be obtained by attachment of a capacitor to almost any portion of the above secondary circuit as a tap to the voltage produced in the resonance circuit. The remaining lead on the capacitor can optionally connect to a rectifier circuit for further conversion to an AC, pulsed DC, or smoothed DC output by conventional means.

Figure 6:
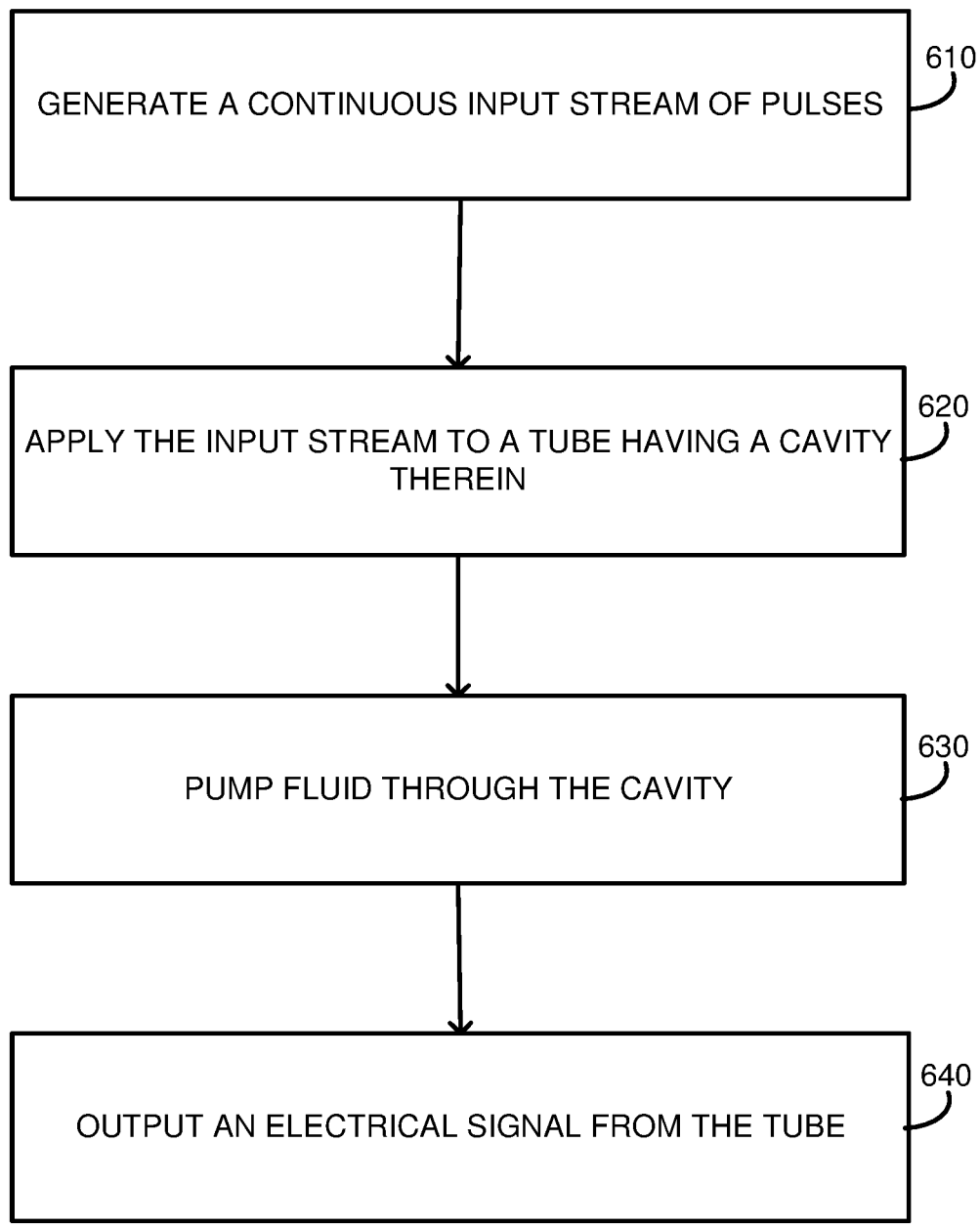
FIG. 6 is a flowchart according to another embodiment for generating electrical energy.

FIG. 6 is a flowchart for generating power according to an embodiment. In process block 610, a continuous stream of pulses is generated, such as by a pulse generator. The pulse generator can generate pulses having a dV/dt of 100V/μs or even 10,000 to 100,000 V/μs or higher. Specific use cases have used between 3 to 10V/μs. In some cases, 1V/μs can be used. In process block 620, the continuous stream of pulses are applied to a tube having a cavity extending therethrough. The tube can be conductive and have fluid continuously pumping through the cavity (process block 630). The fluid can be warmed by a heat sink or other heating element. The fluid can be cooled as it passes through the tube due to the CVE. At process block 640, an electrical signal can be output from the tube having a greater power than was output by the pulse generator due to conversion of thermal energy of the fluid to electrical energy. In some embodiments, an oscillator can be used to generate pulses at a greater frequency than the pulse generator.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A circuit for generating electrical energy, comprising:
   a pulse generator for generating a continuous stream of pulses;
   a negative resistance device coupled to the pulse generator;
   a tube having a cavity therein coupled to the negative resistance device; and
   an output for receiving an electrical output emitted from the tube.

2. The circuit of claim 1, wherein the tube is filled with material having a predetermined permittivity or permeability larger than a vacuum.

3. The circuit of claim 1, further including a pump for pumping fluid through the tube.

4. The circuit of claim 3, wherein the fluid exchanges heat with the tube.

5. The circuit of claim 1, wherein the tube cavity has a semiconductor or metal at least partially filling the cavity.

6. The circuit of claim 1, wherein the tube has a cross-section that is one of the following: round, square, rectangular, elliptical or oval.

7. The circuit of claim 1, wherein the tube is conductive.

8. The circuit of claim 1, further including at least one oscillator component coupled to the tube.

9. The circuit of claim 8, wherein the oscillator component includes an inductor coupled to one end of the tube and a capacitor coupled to an opposite end of the tube.

10. A method for generating electrical energy, comprising:
    generating a continuous input stream of pulses;
    applying the input stream of pulses to a tube having a cavity therein;
    pumping fluid through the cavity; and
    outputting an electrical signal from the tube.

11. The method of claim 10, further including applying thermal energy to the fluid.

12. The method of claim 10, further including passing the continuous input stream of pulses through a negative resistance.

13. The method of claim 10, wherein the tube has a cross-section that is one of the following: an N-sided polygon, round, elliptical or oval.

14. The method of claim 10, wherein the continuous stream of pulses is at a first frequency and further including generating a signal at a second frequency greater than the first frequency using an oscillator circuit coupled to the tube.

15. The method of claim 1, wherein the tube is an elongated cylinder.

16. The method of claim 1, wherein the tube forms an etalon.

17. An apparatus for generating electrical energy, comprising:
    a pulse generator to generate a stream of electrical pulses having a first power;
    a negative resistance coupled in series with the pulse generator; and a load coupled to the negative resistance; and
    a tube having a cavity therein coupled in series with the negative resistance and the load, the tube for providing electrical energy to the load.

18. The apparatus of claim 17, wherein the tube is configured to receive heat that is converted into electrical energy having a second power, greater than the first power, to the load.

19. The apparatus of claim 17, further including an oscillator coupled in series with the tube, wherein the electrical pulses are at a first frequency and the oscillator generates pulses at a second frequency, greater than the first frequency.

20. The apparatus of claim 17, wherein the cavity is filled with material having a permittivity or permeability greater than a vacuum or air.

* * * * *